US011023752B2

(12) United States Patent
Zhang et al.

(10) Patent No.: US 11,023,752 B2
(45) Date of Patent: Jun. 1, 2021

(54) METHOD AND SYSTEM FOR LEARNING ABOUT ROAD SIGNS USING HIERARCHICAL CLUSTERING

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 113 days.

(21) Appl. No.: 16/116,527

(22) Filed: Aug. 29, 2018

(65) Prior Publication Data

US 2020/0074193 A1 Mar. 5, 2020

(51) Int. Cl.
*G06K 9/00* (2006.01)
*G06K 9/62* (2006.01)

(52) U.S. Cl.
CPC ......... *G06K 9/00818* (2013.01); *G06K 9/623* (2013.01); *G06K 9/6219* (2013.01)

(58) Field of Classification Search
CPC .............. G06K 9/6218–6226; G06K 9/00818
See application file for complete search history.

(56) References Cited

U.S. PATENT DOCUMENTS

| 7,975,035 B2 | 7/2011 | Popescu et al. | |
|---|---|---|---|
| 2016/0170414 A1* | 6/2016 | Chen ................... | G08G 1/0112 701/27 |

(Continued)

FOREIGN PATENT DOCUMENTS

| CN | 104036024 A | 9/2014 |
|---|---|---|
| EP | 3261018 A1 | 12/2017 |

OTHER PUBLICATIONS

Anastassov et al., "Analysis of OEM Sensor Data for Determination of Speed Sign Placement on Road Maps", 22nd ITS World Congress, Bordeaux, France, Oct. 5-9, 2015, Paper No. ITS-2121, pp. 1-11.

(Continued)

*Primary Examiner* — Casey L Kretzer
(74) *Attorney, Agent, or Firm* — Ditthvong, Steiner & Mlotkowski

(57) ABSTRACT

A method, system, and computer program product is provided, for example, for learning about a road sign using clustering of pre-processed road sign recognition observations. In an example embodiment, the method may include receiving, by a layered clustering system, the pre-processed road sign recognition observations generated by at least one sensor installed on a vehicle. The pre-processed road sign recognition observations include at least two continuous-value attributes. The method may further include creating, by the layered clustering system, a first clustering label corresponding to a first attribute of the at least two continuous-value attributes for generating a plurality of first clusters. Additionally, the method may include sequentially clustering, by the layered clustering system, the pre-processed road sign recognition observations in the plurality of first clusters with the created first clustering label based on a second attribute of the at least two continuous-value attributes for generating a plurality of second clusters. Further, once the clustering of the pre-processed road sign recognition observations has been performed in this way, the method may further include filtering and removing, by the layered clustering system, outliers of the plurality of first clusters and the plurality of second clusters.

16 Claims, 9 Drawing Sheets

(56) References Cited

U.S. PATENT DOCUMENTS

2018/0025628 A1    1/2018  Ivanov et al.
2018/0189601 A1*   7/2018  Dabeer .................. G01C 21/30
2018/0240335 A1*   8/2018  Dong ................... G08G 1/0112

OTHER PUBLICATIONS

Oracle, "Advanced Store Clustering", Oracle® Retail Advanced Science Engine Cloud Services User Guide Release 15.0, retrieved on Aug. 29, 2018 from https://docs.oracle.com/cd/E76441_01/orase/pdf/orase/150/html/user_guide/clustering.htm, pp. 1-27.
Ester et al., "A Density-Based Algorithm for Discovering Clusters in Large Spatial Databases with Noise", Published in: KDD'96 Proceedings of the Second International Conference on Knowledge Discovery and Data Mining, 1996, pp. 226-231.

* cited by examiner

| Attribute | Reasons to include the attributes |
|---|---|
| Location | LOCATIONS REFER TO LATITUDE AND LONGITUDE OF THE TSR OBSERVATIONS. LOCATIONS OF TSR OBSERVATIONS FOR THE SAME TRAFFIC SIGN SHOULD BE CLOSE TO EACH OTHER. |
| Heading | HEADINGS OF TSR OBSERVATIONS FOR THE SAME TRAFFIC SIGN SHOULD BE SIMILAR AND THEIR DIFFERENCES SHOULD BE LESS THAN 50 DEGREES. |
| Altitude | ALTITUDE CAN DISTINGUISH THE OBSERVATIONS WITH SIMILAR LOCATIONS BUT DIFFERENT ELEVATIONS OF THE ROAD. IT IS USEFUL IN THE OVERPASS OR THE LAYERED INTERCHANGE. |
| Side feature | SIDE FEATURE IS THE LATERAL OFFSET. THIS FEATURE WILL DISTINGUISH THE TSR OBSERVATIONS PLACED ON THE LEFT SIDE OF THE ROAD AND THOSE ON THE RIGHT. |
| Speed type and value | DIFFERENT TRAFFIC SIGNS WILL BE DETECTED AND TRACKED BY THE TSR SYSTEMS AS TSR OBSERVATIONS WITH DIFFERENT SPEED VALUES OR TYPES. |
| Map-matched link | SIGNS THAT ARE MAP-MATCHED INTO DIFFERENT LINKS SHOULD BE TAKEN AS DIFFERENTLY. |

FIG. 5

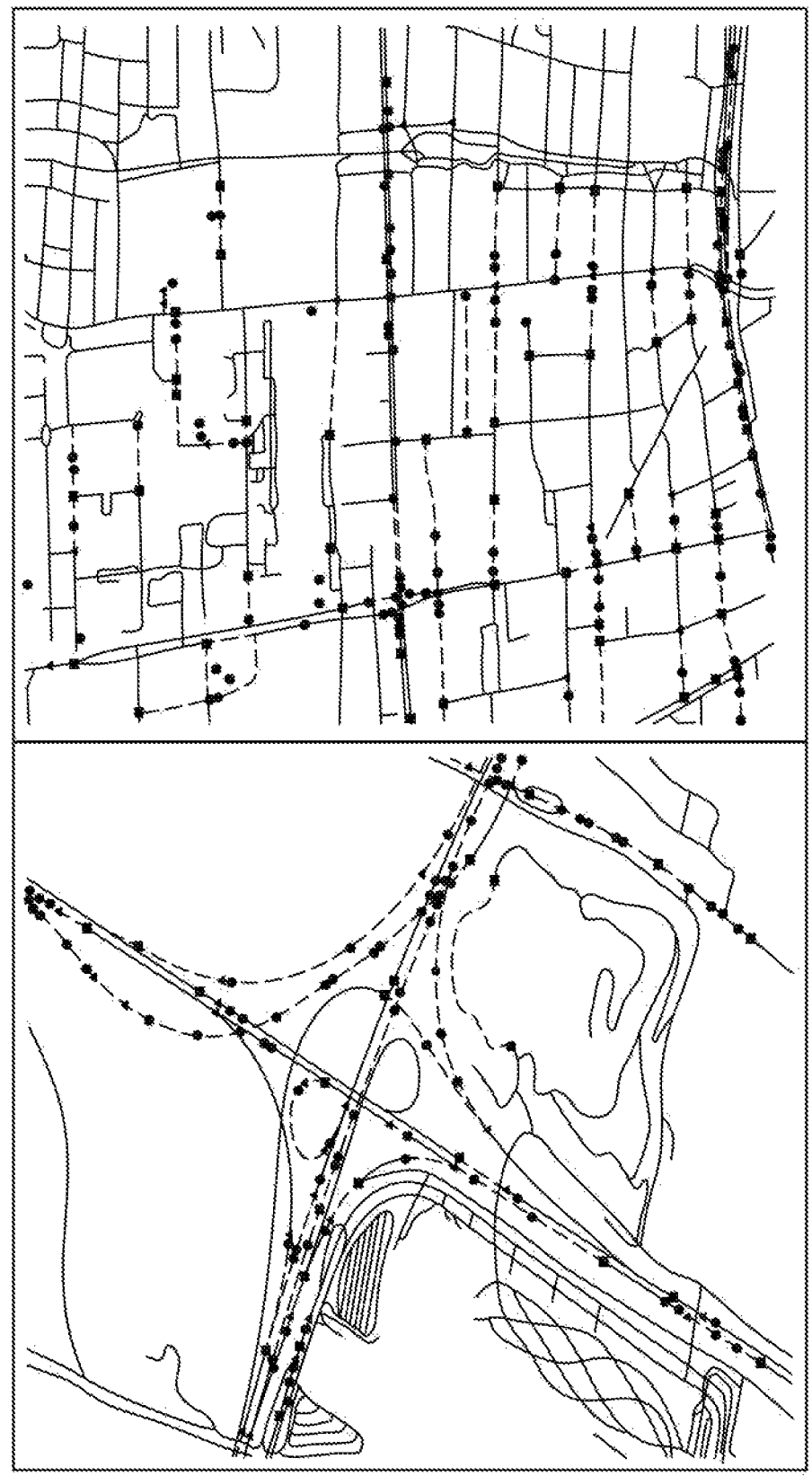

METHOD AND SYSTEM FOR LEARNING ABOUT ROAD SIGNS USING HIERARCHICAL CLUSTERING

TECHNOLOGICAL FIELD

The present disclosure generally relates to a system and method for assisting a driver of a vehicle, and more particularly relates to a system and method for learning about road signs.

BACKGROUND

The automotive industry is focused on delivering safer, more comfortable, and more efficient mobility solutions for users of vehicles. The major requirement in provision of these advanced vehicle mobility solutions is to be able to provide automation of many driving functions. The purpose of such solutions should be to reduce the burden on the drivers of these vehicles, while at the same time providing accurate data for improving reaction times and decision making of the drivers.

Currently, many applications exist which use information retrieved from one or more sources such as map databases, vehicle's on-board sensors, real-time crowd-sourced information, satellite images and the like to help the vehicles in reaching their mobility and automation goals. Such information may be used for deriving data for taking driving decisions, such as learning about speed limits, road segments, geographies, identifying road signs and the like. Thus, it becomes very crucial that all the information should be close to 100% accurate in real-time to reduce driving risks and errors.

BRIEF SUMMARY

In light of the above-discussed problems, there is a need to derive accurate data related to road objects in general and road signs in particular, using information derived from both a map database and vehicles' on-board sensors. Therefore, there exists a need for detecting road signs using the vehicles' on-board sensors in real time and perform analysis, coding, and distribution of relevant information derived from the sensor data.

Further, in order to achieve 100% accuracy, the current technology, for detecting the speed limits accurately and providing driver assistance ingests smart sensor data from the sensors installed on the vehicles and performs analysis, coding, and distribution of relevant information derived from the sensor data and conflated with other sources. The smart sensor data collected is used to update a road sign database, such as a digital map database in real time. However, to update data about the road signs, it is important to correctly identify the road sign.

The methods and systems disclosed herein provide techniques for learning about a road sign, for example, a speed limit sign, by implementing a clustering algorithm as a part of the analysis and coding performed on the data about road signs gathered from the vehicles' on-board sensors. Further, the methods and systems disclose collecting road sign recognition observations generated from the smart sensor data, and map-matching the road sign observations to correct links in the map database and the road sign recognition observations are to be clustered for learning the road signs.

It is to be understood by those of ordinary skill in the art that the methods and systems disclosed herein may be discussed with reference to road signs for exemplary purpose only, and the discussion of road signs is by no means intended to limit the scope of the invention. The invention may also reasonably be applied for other road objects without deviating from the scope of the invention.

In an example embodiment, a method for clustering a plurality of pre-processed road sign recognition observations is provided. The method may include receiving, by a layered clustering system, the pre-processed road sign recognition observations generated by at least one sensor installed on a vehicle, the pre-processed road sign recognition observations comprising at least two continuous-value attributes. The method may further include creating, by the layered clustering system, a first clustering label corresponding to a first attribute of the at least two continuous-value attributes for generating a plurality of first clusters. Additionally, the method may include sequentially clustering, by the layered clustering system, the pre-processed road sign recognition observations in the plurality of first clusters with the created first clustering label based on a second attribute of the at least two continuous-value attributes for generating a plurality of second clusters.

Once the clustering is done, the method may also include filtering and removing, by the layered clustering system, outliers of the plurality of first clusters and the plurality of second clusters.

In some example embodiment, a layered clustering system for clustering a plurality of pre-processed road sign recognition observations may be provided. The layered clustering system may include at least one memory configured to store instructions. The layered clustering system may further include at least one processor configured to execute the instructions to at least receive the pre-processed road sign recognition observations generated by at least one sensor installed on a vehicle, the pre-processed road sign recognition observations comprising at least two continuous-value attributes. Additionally, the at least one processor may be configured to execute instructions to further create a first clustering label corresponding to a first attribute of the at least two continuous-value attributes for generating a plurality of first clusters. Further, the at least one processor may be configured to execute instructions to sequentially cluster the pre-processed road sign recognition observations in the plurality of first clusters with the created first clustering label based on a second attribute of the at least two continuous-value attributes, to generate a plurality of second clusters.

In some example embodiments a computer program product is provided. The computer program product comprising at least one non-transitory computer-readable storage medium having computer-executable program code instructions stored therein, the computer-executable program code instructions comprising program code instructions for receiving the pre-processed road sign recognition observations generated by at least one sensor installed on a vehicle, the pre-processed road sign recognition observations comprising at least two continuous-value attributes. The computer-executable program code instructions further comprising program code instructions for creating a first clustering label corresponding to a first attribute of the at least two continuous-value attributes for generating a plurality of first clusters. The computer-executable program code instructions further comprising program code instructions for sequentially clustering the pre-processed road sign recognition observations in the plurality of first clusters with the created first clustering label based on a second attribute of the at least two continuous-value attributes, for generating a plurality of second clusters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
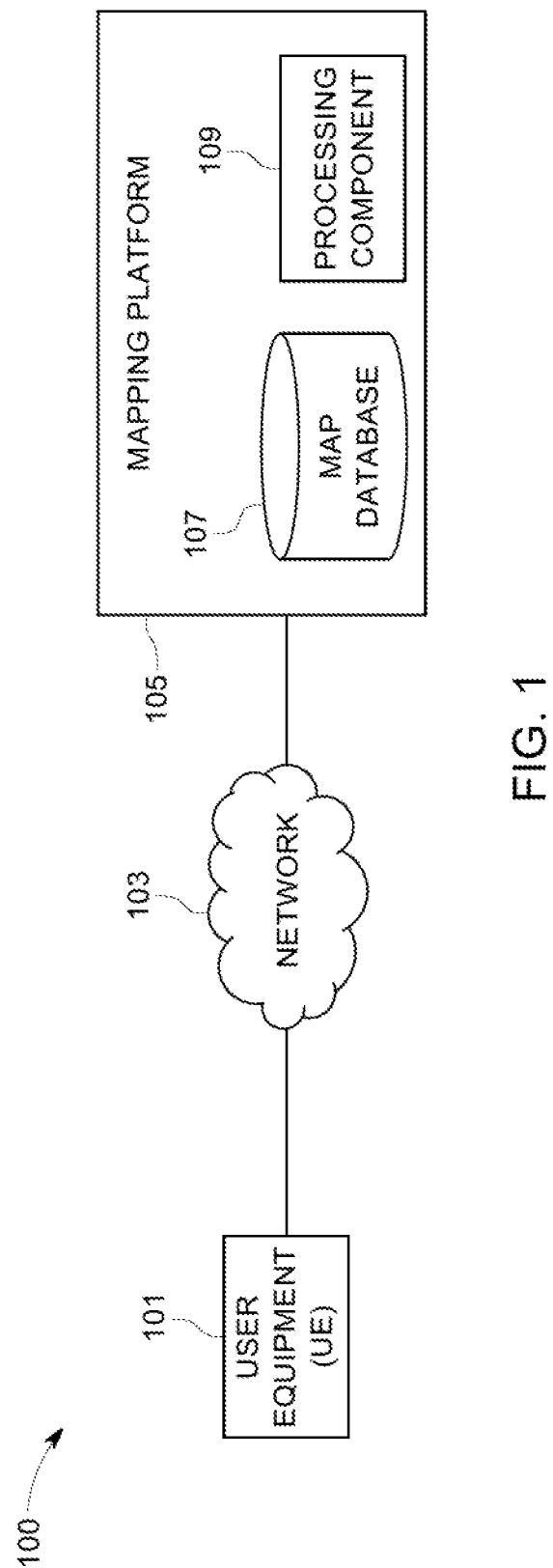
Figure 2:
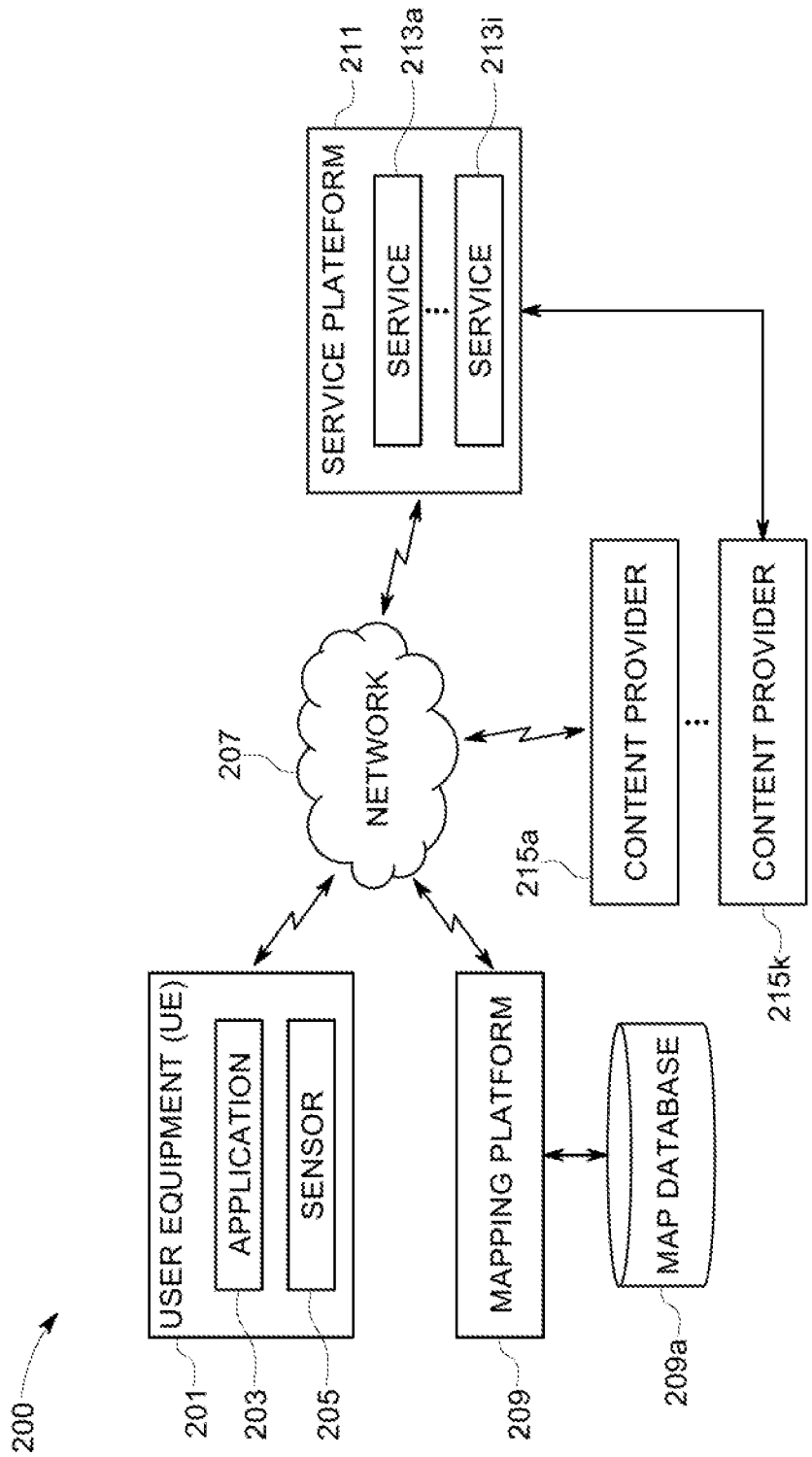
Figure 3B:
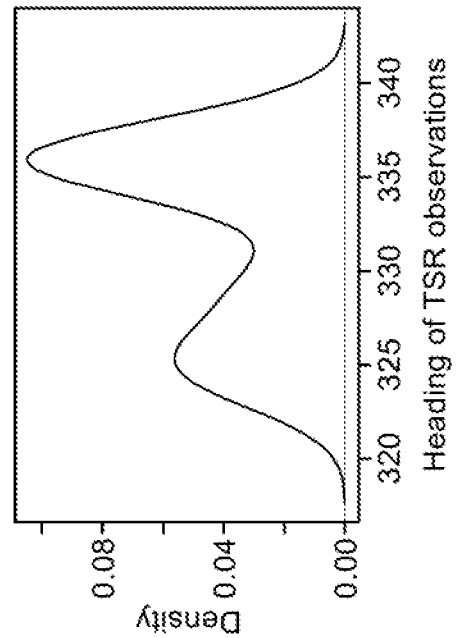
Figure 3C:
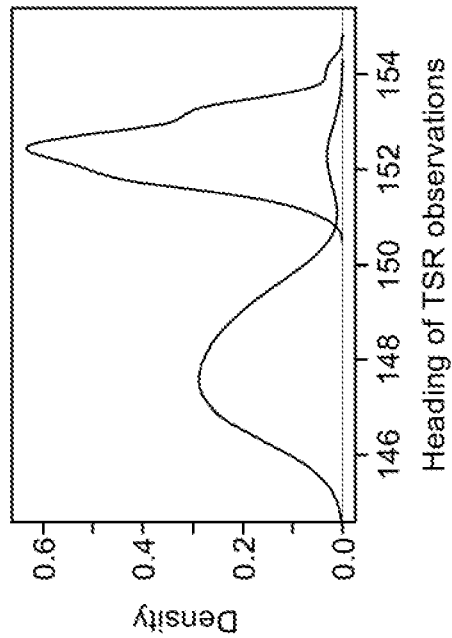
Figure 3A:
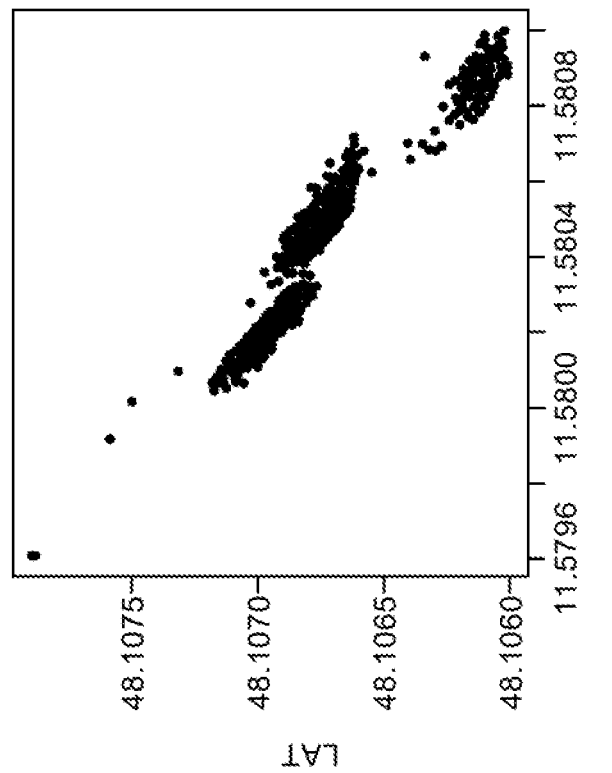
Figure 4:
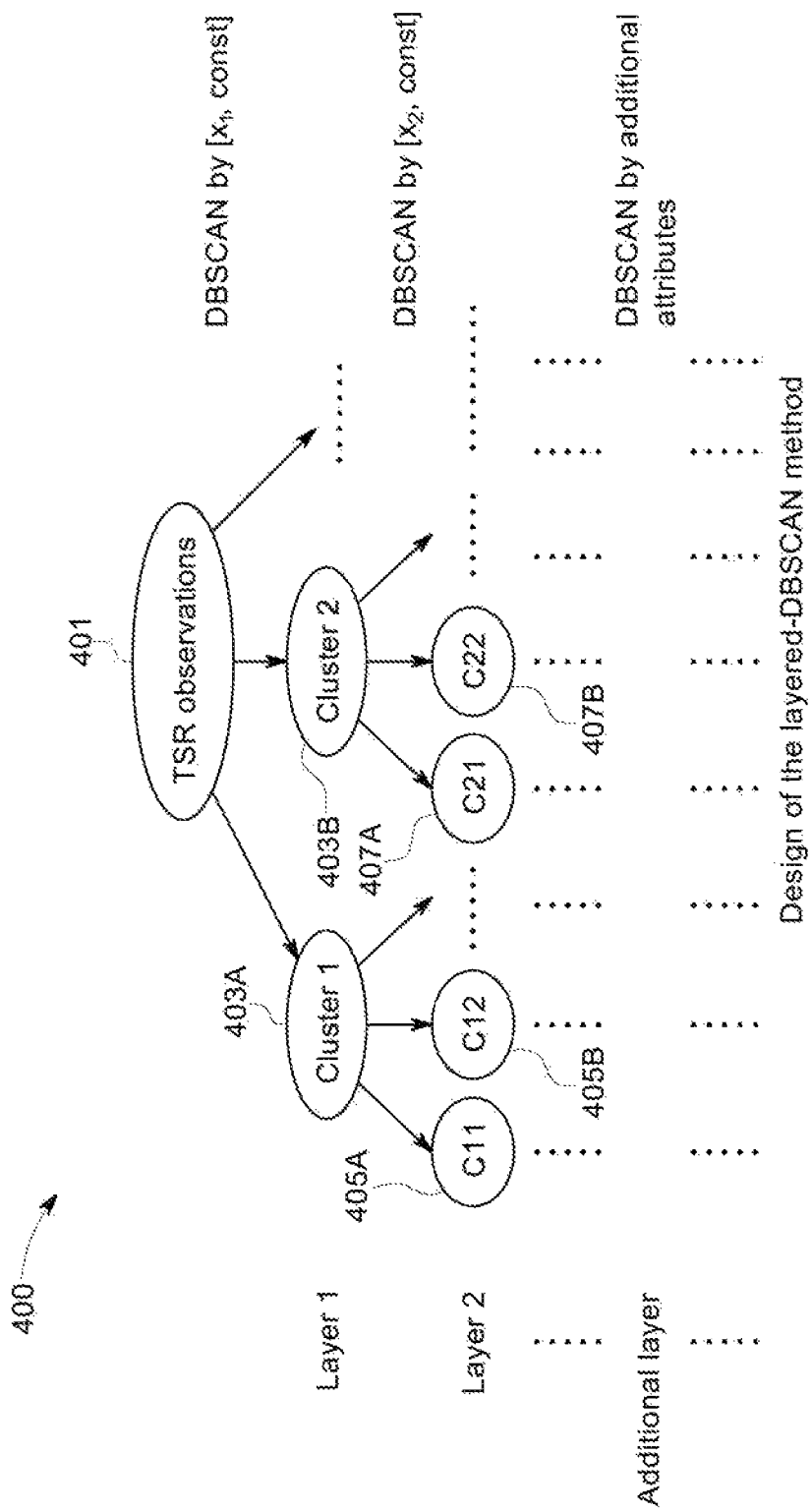
Figure 6:
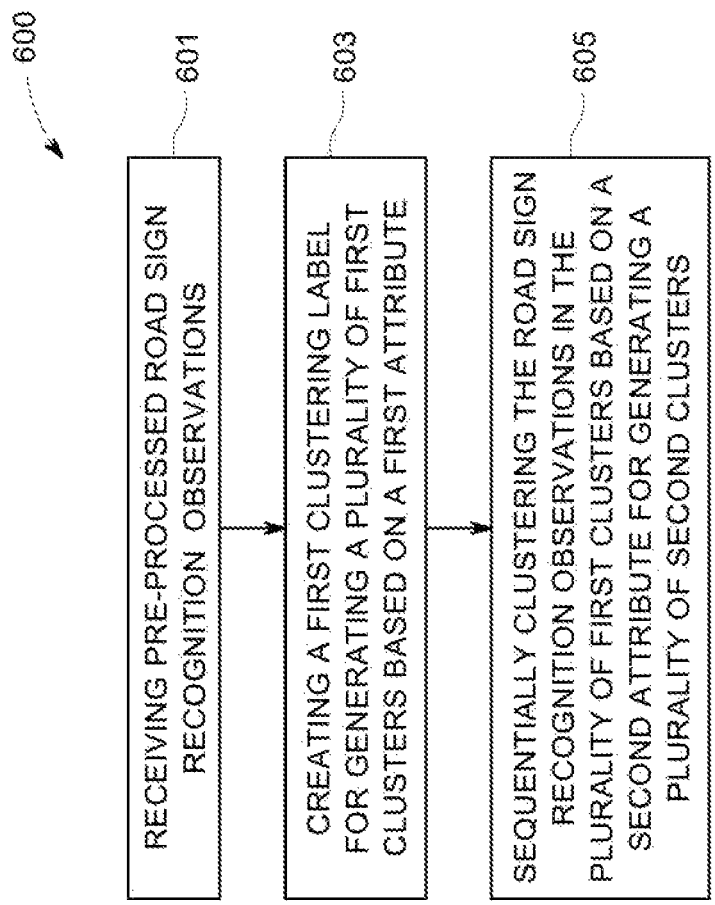
Figure 8A:
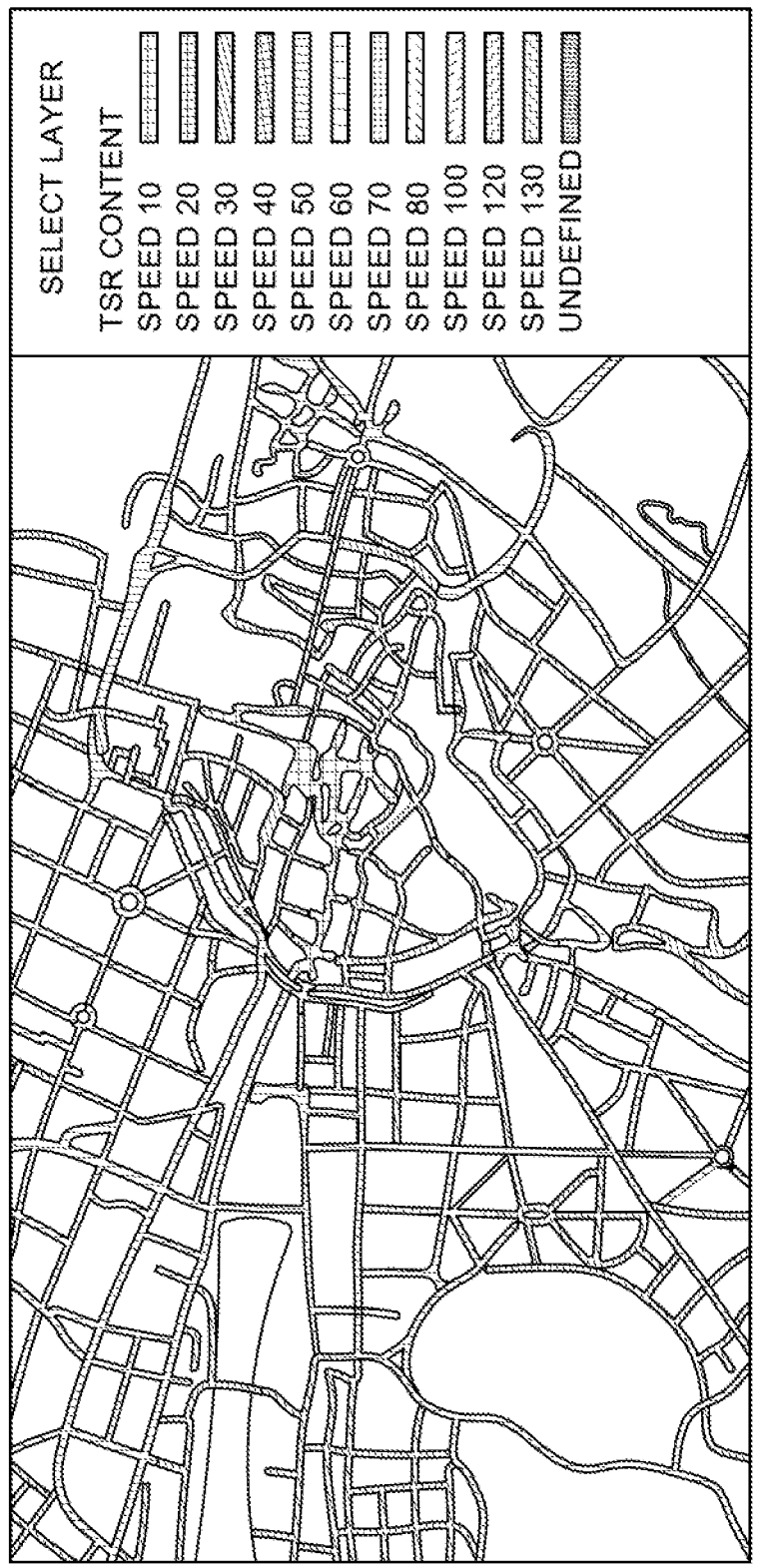
Figure 8B:
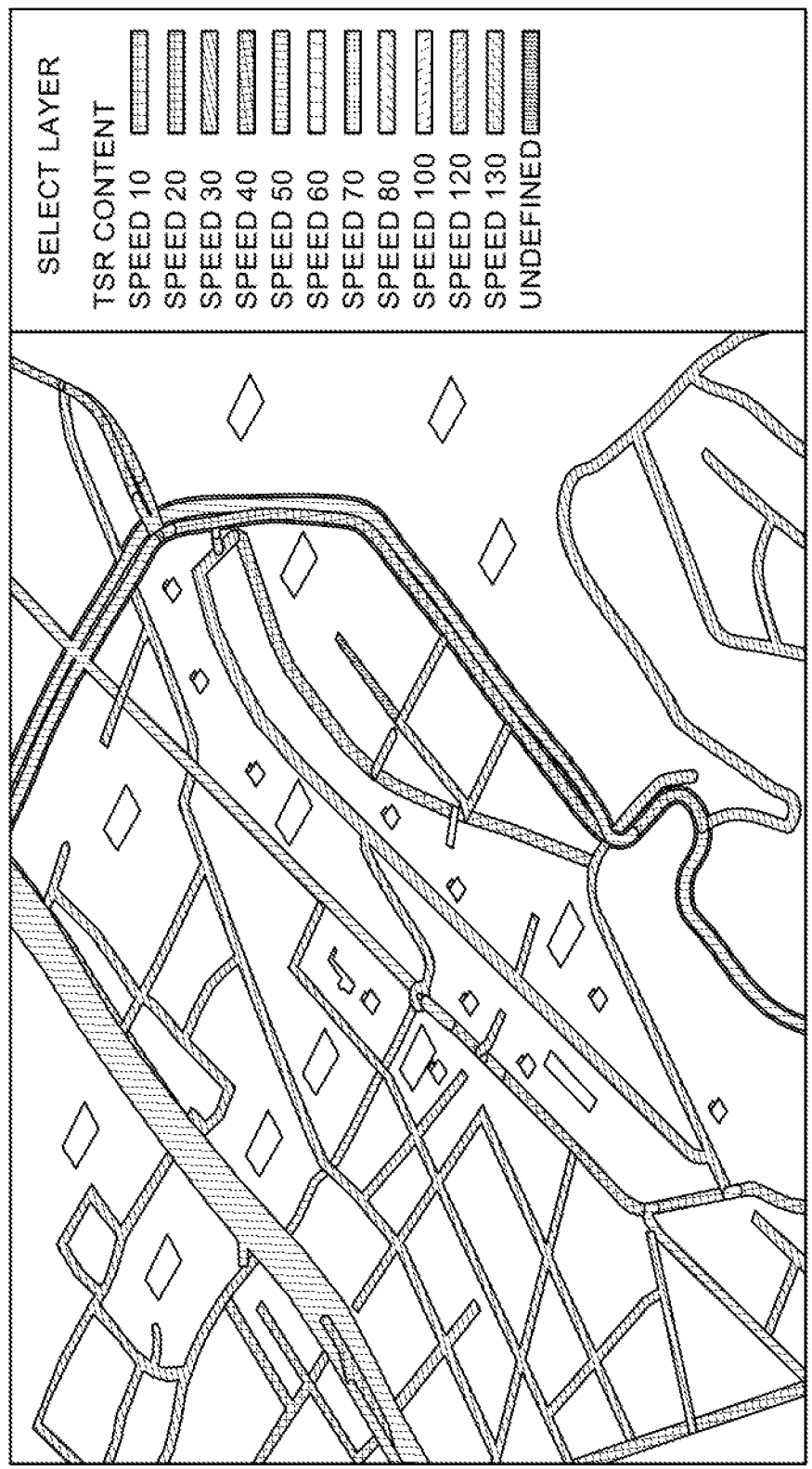

Having thus described example embodiments of the invention in general terms, reference will now be made to the accompanying drawings, which are not necessarily drawn to scale, and wherein:

FIG. 1 illustrates a block diagram of a layered clustering system for clustering multiple pre-processed road sign recognition observations in accordance with an example embodiment;

FIG. 2 illustrates an architectural diagram of the layered clustering system for clustering multiple pre-processed road sign recognition observations using a mapping platform in accordance with an example embodiment;

FIGS. 3A-3C exemplarily illustrate graphical representations related to the pre-processed road sign recognition observations;

FIG. 4 illustrates architectural design of the hierarchical clustering of the pre-processed road sign recognition observations;

FIG. 5 illustrates exemplary attributes for hierarchical clustering of the pre-processed road sign recognition observations;

FIG. 6 illustrates a flow diagram of a method for clustering multiple pre-processed road sign recognition observations according to an example embodiment;

FIGS. 7A-7B exemplarily illustrate a map representation with pre-processed road sign observations map-matched to different links; and FIGS. 8A-8B exemplarily illustrate output of the layered clustering system showing learning of posted road signs along the map-matched links.

DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Currently, navigation systems in vehicles are configured for collecting data related to vehicle's environment based on one or more sensors provided in the vehicle. The one or more sensors may either be associated with the vehicle or may be provided in the vehicle. Such sensors may include, such as an image capturing device, a camera, a mobile device based camera and the like. The environment related data collected by the one or more sensors may relate to such as prescribed speed limit data posted on speed limit signs, accident conditions on the road, construction related updates on a route of the vehicle, diversion related updates posted on diversion signs on roads, any posted sign on the road and the like. The speed limit signs may be provided anywhere on a road or link on which the vehicle is travelling, such as on sides of links or above on a gantry. Such speed limit signs may be detected by an image capturing device.

In some example embodiments, the image capturing device may be a camera of a mobile device carried in the vehicle. In some other example embodiments, the image capturing device may be an on-board camera system and image recognition techniques provided on the vehicle. The data collected by the on-board camera may be further used by the navigation system on the vehicle to adjust a speed limit of the vehicle. The navigation system may be manufactured by an original equipment manufacturer (OEM). In some examples, the OEM may provide the data collected by the image capturing device for updating a map database.

Such map database may be maintained by content providers, such as a map service provider. The map database may receive data related to posted signs from a plurality of vehicle sensors using crowdsourcing techniques. The received data may then be clustered and used to learn the posted signs on roads. However, using the methods and systems disclosed in the example embodiments provided herein, the OEM vehicle's camera system data might be augmented with data provided by the map service provider, to learn about the posted road signs.

FIG. 1 illustrates a block diagram of a layered clustering system 100 for clustering multiple pre-processed road sign recognition observations in accordance with an example embodiment. As used herein, "pre-processed road sign recognition observations" refer to tuples of data that are obtained on processing of sensor data generated by the sensors. The tuples are used to learn about the road signs posted along the route navigated by a vehicle. The layered clustering system 100 includes user equipment (UE) 101, which may be in communication with a mapping platform 105, over a network 103. In an example embodiment, the user equipment 101 may include the sensors that may be used to obtain the sensor data. The network 103 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of a vehicle. The user equipment 101 may be installed in the vehicle and may be configured to receive pre-processed road sign recognition observations from multiple sensors. The user equipment 101 may also include the sensors, for example, an image capturing device, such as a camera.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a mapping application, such that the user equipment 101 may provide navigational assistance to a user among other services provided through access to the mapping platform 105.

The mapping platform 105 may also include a map database 107, which may include node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 can include data about the POIs and their respective locations in the POI records. The map database 107 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 107 can include event data (e.g., traffic incidents, construction activities, scheduled events, unscheduled events, etc.) associated with the POI data records or other records of the map database 107 associated with the mapping platform 105. The map database 107 may additionally include data about traffic regulations, speed limits, posted traffic signs, posted speed limit signs, heading data and the like.

A content provider such as a map developer may maintain the mapping platform 105. By way of example, the map developer can collect geographic data to generate and enhance the mapping platform 105. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from multiple data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 107 of the mapping platform 105 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 101, for example. The navigation-related functions can correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the map database 107 may be a master geographic database configured at a server side, but in alternate embodiments, a client side map database 107 may represent a compiled navigation database that may be used in or with end user devices (e.g., user equipment 101) to provide navigation, speed adjustment and/or, map-related functions. For example, the map database 107 may be used with the end user device 101 to provide an end user with navigation features. In such a case, the map database 107 can be downloaded or stored on the end user device, that is, the user equipment 101 which can access the map database 107 through a wireless or a wired connection, over the network 103.

In one embodiment, the end user device or the user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or another device that can perform navigation-related functions, such as digital routing and map display. An end user can use the user equipment 101 for navigation and map functions such as guidance and map display, adjusting of vehicle speed based on map data and user driving behavior. The user equipment 101 may include an application that may enable the user to access the map database 107 for availing the functions disclosed above.

FIG. 2 illustrates an architectural diagram 200 of the layered clustering system 100 for clustering multiple pre-processed road sign recognition observations using the mapping platform 105 in accordance with an example embodiment. The layered clustering system 100 includes user equipment 201, including an application 203 for accessing one or more map and navigation related functions. The user equipment 201 also includes a sensor 205 module, wherein the sensor module may include at least one sensor. The sensor module may include sensors such as a camera, an acceleration sensor, a gyroscopic sensor, a LIDAR sensor, a proximity sensor, a motion sensor and the like. The data collected by the sensor module 205 may be used to gather information related to an environment of the vehicle. For example, one of the sensors may include an advanced image capturing and recognition module, which may be used to gather an image data related to a posted sign in vicinity of the vehicle. In other examples, the posted sign may be any other traffic road sign. The image data may be used to determine an observed numerical value for the vehicle, such as based on the speed limit sign. In one example, the image data may be processed by the application 203 running on the user equipment 201 to determine the observed numerical value for the vehicle. In one example, the observed numerical value may be a speed limit. In another example, the image data may be processed by a processing component on a map database, such as the processing component 109 of the mapping platform 105. The system 200 also depicts a mapping platform 209 including a map database 209a, which is similar to the map database 107 depicted in FIG. 1.

Additionally, the layered clustering system 100 may include a services platform 211 that may be used to provide navigation related functions and services 213a-213i to the application 203 running on the user equipment 201. The services 213a-213i may include such as navigation functions, speed adjustment functions, traffic related updates, and weather related updates, warnings and alerts, parking related services, indoor mapping services and the like. The services 213a-213i may be provided by a plurality of content providers 215a-215k. In some examples, the content providers 215a-215k may access various SDKs from the services platform 211 for implementing one or more services.

In an example, the services platform 211 and the mapping platform 209 may be integrated into a single platform to provide a suite of mapping and navigation related applications for OEM devices, such as the user equipment 201. The user equipment 201 may be configured to interface with the services platform 211, the content provider's services 215a-215k, and the mapping platform 209 over a network 207. Thus, the mapping platform 209 and the services platform 211 may enable provision of cloud-based services for the user equipment 201, such as for providing speed limit related recommendation to the user of the vehicle carrying the user equipment 201.

In an example embodiment, the mapping platform 209 and the services platform 211 may be configured for providing hierarchical clustering of road sign recognition observations captured by one or more sensors associated with the sensor module 205. The road sign recognition observations may need to be pre-processed before clustering them for further learning about the posted road signs.

In some example embodiments, the mapping platform 209 may also be configured in a similar way to performing learning and clustering about other road objects, apart from road signs. Such objects may be static road objects such as speed breakers, sharp turns, U-turns, tunnels, hoardings, banners, posters, flyers and the like.

FIGS. 3A-3C exemplarily illustrates graphical representations related to the pre-processed road sign recognition observations. FIG. 3A illustrates distribution of location attribute of road sign recognition observations. FIGS. 3B and 3C illustrate distribution of heading attribute for road sign recognition observations.

As can be seen from FIGS. 3A-3C, the road sign recognition observations received from running vehicles can access important road sign information on road. But these observations may be in raw form and need to be pre-processed before starting to extract information from them for further processing. The pre-processing may include first map-matching the road sign recognition observation on the correct links, before performing clustering of these observations. The map-matched road sign recognition observations may have several features. Some of the observations may refer to the same road sign and thus, they should be clustered as one learned traffic sign.

In some example embodiments, the road sign recognition observations may comprise a plurality of features related to categorical attributes, such as the sign type, speed value, side feature and map-matched link associated with the road sign recognition observation. The observations with different categorical feature values should be clustered separately because they may represent different traffic signs.

In some example embodiments, the road sign recognition observations may comprise a plurality of features related to continuous-value attributes, such as locations, altitude, and heading. Thus, given the same sign type, speed value, side feature and map-matched link, the road sign recognition observations with similar locations, altitude, and headings should be clustered together and used for learning a traffic sign.

As illustrated in FIG. 3A, the locations of road sign recognition observations for the same road sign exhibit density distributed clustering features. This is because the running vehicles may have different versions of road sign recognition systems and different detection ranges and degrees of GPS errors. Similarly as illustrated in FIGS. 3B-3C, the headings of the road sign recognition observations also show density distributed features where most of them are within 10-degree difference from that of the real road sign and the maximum degree variation usually does not exceed 20 degrees.

Based on the density distributed features of the data attributes, any density based clustering algorithm may be used for clustering the pre-processed road sign recognition observations. In an example embodiment, the pre-processed road sign recognition observations may be clustered using density-based spatial clustering of applications with noise (DBSCAN) method. The DBSCAN method can both cluster the closely-packed observations and filter out the outliers. In DBSCAN method there are two control parameters which should be set empirically by the data nature and research requirements: minPts (minimum number of points required to form a dense region) and eps maximum searching radius. Generally, the DBSCAN method is non-layered. However, for the road sign recognition observations, non-layered approach may not work. As the locations and headings have different physical meanings and the former are measured by the latitude and longitude while the latter are measured by degrees, one cannot simply merge these two data attributes and conduct the clustering. That is because: if the clustering is conducted on locations or headings separately, the parameter values for minPts and eps can be reasonably set by considering the corresponding physical meanings; if the clustering is conducted on the combination of locations and headings, the parameter setting can be difficult and sometimes arbitrary.

Thus, the methods and systems proposed herein provide for clustering these observations using an expandable and robust layered DBSCAN method to learn about the traffic signs.

FIG. 4 illustrates architectural design of the hierarchical clustering of the pre-processed road sign recognition observations according to a layered density based clustering method, such as the layered DBSCAN algorithm 400.

The layered DBSCAN algorithm 400 may start with the pre-processed road sign observations, also interchangeably referred to herein as the Traffic Sign Recognition (TSR) observations 401 as the input. The TSR observations may be associated with a plurality of attributes which are illustrated in detail in FIG. 5. Some of these attributes may be continuous-value attributes discussed earlier. The algorithm 400 may proceed with creating a first clustering label corresponding to a first attribute from the continuous-value attributes for generating a plurality of first clusters 403a, 403b and the like for a first layer of clustering, Layer 1. Further, the algorithm 400 may proceed with sequentially the TSR observations in the plurality of first clusters with the created first clustering label based on a second attribute of the continuous-value attributes for generating a plurality of second clusters, 405a, 405b, 407a, 407b and so on for a second layer of clustering, Layer 2. The algorithm 400 may keep hierarchically clustering the TSR observations by adding as many layers as desired.

In an example, the layered DBSCAN algorithm 400 provided herein may be illustrated as:

---
Layered-DBSCAN method in this study

---
Input: TSR observations [α] with a list of attributes: list([x$_1$], [x$_2$], ... ... );
Output: clustering label for each TSR observation;
Create initial and same clustering label for all TSR observation: label;
Assign i = 1;
Repeat
    Add a constant attribute [const] for [x$_i$];
    Implement dbscan([x$_i$, const], minPts$_i$, eps$_i$) on TSR
    observations with same label;
    Update label according to the clustering result;
    i = i + 1;
Until i = max(i).

---

Where max(i) is the total number of attributes considered, minPts is the minimum number of points to form a cluster and eps is the minimum searching distance. Generally, DBSCAN clusters the points by the following logic: for a target sign location, if there are more than minPts other signs locations within eps distance threshold, this target signs and the other signs within the distance threshold can form a cluster; otherwise, this target sign location will be taken as an outliner.

In an example embodiment, minPts may be set to be 3 and eps is may be set to 15 meters for location clustering.

In an example embodiment, minPts may be set to be 3 and eps may be set as 50 degrees for heading clustering.

Thus, the method 400 may include implementing DBSCAN sequentially on each of the continuous-value attributes discussed earlier. For instance, the DBSCAN can be first implemented on the locations of TSR observations and create a location clustering label; then, the DBSCAN can be implemented on headings which have the same location clustering label and create another heading clustering label. Two clustering labels can jointly distinguish the TSR observations on in different locations and driving directions. Thus, the algorithm 400 may be more accurate than the previous DBSCAN method which only implements the DBSCAN on locations and may wrongly put the TSR observations on different directions into the same cluster.

In some example embodiments, the algorithm 400 may be expanded to include as many data attributes as possible. Some of the data attributes are illustrated in FIG. 5.

Thus, using the methods and system disclosed herein, it may be possible to put the location, heading or other attributes into the same layer of DBSCAN. However, the parameter setting in DBSCAN may be difficult as the physical meanings of heading are measured by degree while location is measured by distance. For example, when only locations are clustered the setting of eps=15 means that signs locations within 15 meters should be put into the same clusters. In comparison, when both location and heading are clustered, setting of eps=15 cannot be explained. Thus, Layered-DBSCAN can avoid the problems in explaining the physical meaning. This method 400 divides the DBSCAN into two different layers which can be more accurately used to explain and modify the physical meanings of the various parameters.

For example, in heading clustering, heading of traffic sign is measured as the degree difference between the driving direction and due north. Thus, when eps is set as 50 degrees, along with putting the headings of 10 and 40 into the same cluster, the headings of 10 and 330 are also put in the same cluster. This is the additional filtering in the clustering heading. Similarly, in altitude clustering, the layered DBSCAN is different from location clustering. Altitude clustering may be used to learn signs at different z-levels.

Thus, using the method 400, a set of pre-processed road sign recognition observations may be clustered using at least two continuous valued attributes, such as locations and headings. While clustering, the road sign recognition observations with the same sign type, speed value, side feature and map-matched link may be clustered. This is because the road sign recognition observations with either different sign type, different speed value, different side feature or different map-matched may correspond to a totally different road sign. After clustering, the road sign recognition observations may then be put into several different clusters and some of them may be identified as outliers. The outliers may then be filtered out and average of the latitude, longitude and heading of all road sign recognition observations in the same clusters is then taken as the learned traffic sign.

FIG. 5 illustrates exemplary attributes for hierarchical clustering of the pre-processed road sign recognition observations.

The table 500 illustrates the attribute 501 and reason for including the attribute 503 as a parameter for hierarchical clustering.

One of the attributes may be location 501a, which may be measures in latitude and longitude coordinates.

Another attribute may be heading 501b, which may be measured in degrees, and headings of observations for the same road sign, or traffic sign should be similar.

Another attribute may be altitude 501c, which may be used to distinguish observations with similar locations, but different elevations. For example, it may useful to distinguish observations by altitude in structures such as an overpass or a layered interchange.

Another attribute may be a side feature, 501d, such as the lateral offset. The lateral offset may be used to distinguish the side where the road sign is placed on a link, such as on the left side or the right side.

Another attribute may be speed type and value 501e.

Another attribute may be map-matched link, 501*f*. The observations that belong to different links may be taken differently.

The attributes listed in table 500 are for exemplary purpose only. Any number of attributes may be added to the list of attributes for performing hierarchical clustering on the pre-processed road sign recognition observations according to the methods and systems disclosed herein.

FIG. 6 illustrates a flow diagram of a method 600 for clustering multiple pre-processed road sign recognition observations according to an example embodiment. The method 600 may include receiving a number of pre-processed road sign recognition observations, at 601. The road sign recognition observations may observed by one or more sensors installed on a vehicle. The road sign recognition observations may be associated with a number of attributes. Some of these attributes may be continuous-valued attributes, while others may be categorical attributes. The pre-processed observations may be obtained from raw road sign recognition observations after map-matching them to their correct links. Once the road sign recognition observations have been received, at 603, a first clustering label may be created for generating a plurality of first clusters based on a continuous value attribute of the road sign recognition observations.

In some example embodiments, the plurality of first clusters may be generated on the basis of a density based clustering algorithm, such as the DBSCAN algorithm. The process of clustering may be continued hierarchically, at 605, by sequentially clustering the pre-processed road sign recognition observations in the plurality of first clusters based on a second continuous valued attribute, for generating a plurality of second clusters.

Further, once the road sign observations have been clustered, outliers from the plurality of first clusters and the plurality of second clusters may be removed to filter the road sign recognition observations. Finally, the set of filtered observations may be used to identify a value for the road sign based on a statistical measure, such as a mean of all the filtered observations.

The hierarchical clustering may be continued for as many attributes as desired for implementing a layered DBSCAN method for clustering the road sign recognition observations.

In an example embodiment, an apparatus for performing the method 600 of FIG. 6 above may comprise a processor (e.g. the processor 111) configured to perform some or each of the operations of the method of FIG. 6 described previously. The processor may, for example, be configured to perform the operations (601-605) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-605) may comprise, for example, the processor 111 which may be implemented in the user equipment 101 and/or a device or circuit for executing instructions or executing an algorithm for processing information as described above.

In some example embodiments, the method 600 may be implemented as a set of operations executed by at least one processor using a non-transitory computer-readable storage medium having computer-executable program code instructions stored thereon. Accordingly, in some example embodiments, such a non-transitory computer readable storage medium may be provided. The computer-executable program code instructions, when executed by the at least one processor, cause the at least one processor to perform operations for clustering a plurality of pre-processed road sign recognition observations, the operations comprising a) receiving the pre-processed road sign recognition observations generated by at least one sensor installed on a vehicle, the pre-processed road sign recognition observations comprising at least two continuous-value attributes; b) creating a first clustering label corresponding to a first attribute of the at least two continuous-value attributes for generating a plurality of first clusters; and c) sequentially clustering the pre-processed road sign recognition observations in the plurality of first clusters with the created first clustering label based on a second attribute of the at least two continuous-value attributes, for generating a plurality of second clusters.

FIGS. 7A-7B exemplarily illustrates a map representation with pre-processed road sign observations map-matched to different links based on the method 600 disclosed above. The various.

FIG. 7A illustrates an exemplary user interface illustrating map-matched road sign observations on a map display. The map display may be such as a street level or a geographical area level display of a map depicting various entities such as links, streets, and geographical regions, such as using differing colors for each type of entity. The map display may depict various sign locations across a link, wherein the sign location may be depicted as dots on solid lines depicting links. In the exemplary user interface of FIG. 7A, the map-matched links are depicted by dashed lines. In some other example embodiments the map-matched links may be depicted using some other variations, such as using a different color than the background color, using a thicker line width than other links, using a differing pattern and the like.

In some example embodiments, the user interface for displaying a map may also indicate a starting node and an ending node of the link, such as in the manner depicted in FIG. 7B, using different shapes, like a triangular block for the starting node and a square block for the ending node.

In some example embodiments, the map display may also be used to provide indications of speed limits on various links, on the basis of learning about the road sign, such as a speed limit sign, using the clustering algorithm discussed in conjunction with method 600.

FIGS. 8A-8B exemplarily illustrates output of the layered clustering system showing learning of posted road signs along the map-matched links. Based on the learning about the posted road signs, which may be speed limit signs, the speed limit values for different links may be identified. These speed limit values may then be displayed to the user, such as a user carrying a navigation equipment 101 in a vehicle on a display screen associated with the user equipment 101. In some example embodiments, the display may be a user equipment 101 based display, such on a screen of the user equipment 101. In other embodiments, the display may be implemented separately from the user equipment 101, such as using a head mounted display, a projection based display, using a mobile device, a smart goggle, a virtual reality display, an augmented reality display and the like.

In some example embodiments, the display may present a user interface for depicting a map, such as in FIGS. 8A-8B, in which speed limit values for different links in a geographical region may be displayed on a map using different patterns.

In some other example embodiments, the different speed limit values may be displayed using different colors to provide a visualization of the information learned about different speed limit signs on different links using the hierarchical clustering techniques discussed earlier.

Thus, based on the hierarchical clustering techniques discussed in the methods and systems disclosed herein, data about a road sign or for a road object may be learned using regular customer vehicles within a few hours. Previously, such data was mostly gathered by probe vehicles which could sometimes take even months to drive a road to gather road sign data.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for clustering a plurality of pre-processed road sign recognition observations, comprising:
   receiving, by a layered clustering system, the pre-processed road sign recognition observations generated by at least one sensor installed on a vehicle, the pre-processed road sign recognition observations comprising at least two continuous-value attributes;
   creating, by the layered clustering system, a first clustering label corresponding to a first attribute of the at least two continuous-value attributes for generating a plurality of first clusters;
   sequentially clustering, by the layered clustering system, the pre-processed road sign recognition observations in the plurality of first clusters with the created first clustering label based on a second attribute of the at least two continuous-value attributes for generating a plurality of second clusters; and
   map-matching the pre-processed road sign recognition observations to a road link in a map database by the layered clustering system prior to the sequential clustering,
   wherein each of the at least two continuous-value attributes of the pre-processed road sign recognition observations is one of a location, a heading, and an altitude generated by the at least one sensor, and
   wherein the pre-processed road sign recognition observations with similar locations but different elevations are distinguished by way of the continuous-value altitude attribute.

2. The method of claim 1 further comprising:
   filtering and removing, by the layered clustering system, outliers of the plurality of first clusters and the plurality of second clusters.

3. The method of claim 2, further comprising processing the at least two continuous-value attributes of the pre-processed road sign recognition observations by the layered clustering system in the plurality of first clusters and the plurality of second clusters to generate a learned traffic sign on removal of the outliers from the plurality of first clusters and the plurality of second clusters.

4. The method of claim 1, wherein the pre-processed road sign recognition observations further comprise a plurality of categorical attributes, the plurality of categorical attributes are side, sign type, speed type, and map-matched link associated with the pre-processed road sign recognition observations.

5. The method of claim 1, wherein the pre-processed road sign recognition observations are generated from sensor data, wherein the sensor data comprises position data, speed data, heading data, and altitude data generated by the at least one sensor installed on the vehicle.

6. The method of claim 1, wherein the layered clustering system utilizes a density-based spatial clustering of applications with noise (DBSCAN) method.

7. The method of claim 1, wherein the altitude distinguished observations comprise structures including an overpass or a layered interchange.

8. A layered clustering system for clustering a plurality of pre-processed road sign recognition observations, the layered clustering system comprising:
   at least one memory configured to store instructions; and
   at least one processor configured to execute the instructions to:
   receive the pre-processed road sign recognition observations generated by at least one sensor installed on a vehicle, the pre-processed road sign recognition observations comprising at least two continuous-value attributes;
   create a first clustering label corresponding to a first attribute of the at least two continuous-value attributes for generating a plurality of first clusters;
   sequentially cluster the pre-processed road sign recognition observations in the plurality of first clusters with the created first clustering label based on a second attribute of the at least two continuous-value attributes, to generate a plurality of second clusters; and
   map-match the pre-processed road sign recognition observations to a road link in a map database by the layered clustering system prior to the sequential cluster,
   wherein each of the at least two continuous-value attributes of the pre-processed road sign recognition observations is one of a location, a heading, and an altitude generated by the at least one sensor, and
   wherein the pre-processed road sign recognition observations with similar locations but different elevations are distinguished by way of the continuous-value altitude attribute.

9. The layered clustering system of claim 8, wherein the at least one processor is further configured to:
   filter and remove outliers of the plurality of first clusters and the plurality of second clusters.

10. The layered clustering system of claim 9, wherein the at least one processor is further configured to process the at least two continuous-value attributes of the pre-processed road sign recognition observations in the plurality of first clusters and the plurality of second clusters to generate a learned traffic sign on removal of the outliers from the plurality of first clusters and the plurality of second clusters.

11. The layered clustering system of claim 8, wherein the pre-processed road sign recognition observations further comprise categorical attributes, the categorical attributes are side, sign type, speed type, and map-matched link corresponding to the pre-processed road sign recognition observations.

12. The layered clustering system of claim 8, wherein each of the at least two continuous-value attributes of the pre-processed road sign recognition observations is one of a location, a heading, and an altitude generated by the at least one sensor.

13. The layered clustering system of claim 8, wherein the pre-processed road sign recognition observations are generated from sensor data, wherein the sensor data comprises position data, speed data, heading data, and altitude data generated by the at least one sensor installed on the vehicle.

14. The layered clustering system of claim 8, wherein the at least one processor is further configured to sequentially cluster the pre-processed road sign recognition observations, based on a density-based spatial clustering of applications with noise (DBSCAN) method.

15. A computer program product comprising at least one non-transitory computer-readable storage medium having computer-executable program code instructions stored therein, executable by at least one processor for clustering a plurality of pre-processed road sign recognition observations, the computer-executable program code instructions comprising program code instructions for:

receiving the pre-processed road sign recognition observations generated by at least one sensor installed on a vehicle, the pre-processed road sign recognition observations comprising at least two continuous-value attributes;

creating a first clustering label corresponding to a first attribute of the at least two continuous-value attributes for generating a plurality of first clusters;

sequentially clustering the pre-processed road sign recognition observations in the plurality of first clusters with the created first clustering label based on a second attribute of the at least two continuous-value attributes, for generating a plurality of second clusters; and map-matching the pre-processed road sign recognition observations to a road link in a map database by the layered clustering system prior to the sequential clustering, wherein each of the at least two continuous-value attributes of the pre-processed road sign recognition observations is one of a location, a heading, and an altitude generated by the at least one sensor, and wherein the pre-processed road sign recognition observations with similar locations but different elevations are distinguished by way of the continuous-value altitude attribute.

16. The computer program product of claim 15, wherein the computer-executable program code instructions further comprise program code instructions for:

filtering and removing outliers of the plurality of first clusters and the plurality of second clusters.

* * * * *